United States Patent
Henry et al.

(10) Patent No.: US 6,519,696 B1
(45) Date of Patent: Feb. 11, 2003

(54) PAIRED REGISTER EXCHANGE USING RENAMING REGISTER MAP

(75) Inventors: G. Glenn Henry, Austin, TX (US); Terry Parks, Austin, TX (US)

(73) Assignee: I.P. First, LLC, Fremont, CA (US)

( * ) Notice: Subject to any disclaimer, the term of this patent is extended or adjusted under 35 U.S.C. 154(b) by 0 days.

(21) Appl. No.: 09/538,314

(22) Filed: Mar. 30, 2000

(51) Int. Cl.[7] .......................... G06F 9/302; G06F 9/318
(52) U.S. Cl. ...................... 712/222; 712/242; 712/243; 712/213
(58) Field of Search ................................ 712/242, 243, 712/245, 222, 213, 212, 206, 209; 711/221, 212

(56) References Cited

U.S. PATENT DOCUMENTS

| | | | |
|---|---|---|---|
| 5,367,650 A | * 11/1994 | Sharangpani et al. | 711/221 |
| 5,634,118 A | 5/1997 | Blomgren | 712/226 |
| 6,014,743 A | * 1/2000 | Henry et al. | 712/244 |

* cited by examiner

*Primary Examiner*—Daniel H. Pan
(74) *Attorney, Agent, or Firm*—Richard K. Huffman; James W. Huffman

(57) ABSTRACT

An apparatus and method are provided for performing a floating point exchange operation in a pipeline microprocessor in zero effective clock cycles. The present invention exploits the pattern of floating point operations common to most floating point software algorithms where floating point exchange operations appear as every other instruction between floating point computational instructions. The apparatus includes translation logic, that pairs the operations directed by a floating point macro instruction and a floating point exchange macro instruction by generating a micro instruction with an exchange extension. The exchange extension directs the microprocessor to perform the floating point exchange operation in parallel with the operation prescribed by the floating point macro instruction within a single floating point unit. The apparatus also has floating point register logic that receives the micro instruction and exchange extension, and which performs the floating point exchange operation in parallel with the operation directed by the micro instruction.

36 Claims, 7 Drawing Sheets

Pipeline Microprocessor With Floating Point Unit

*Floating Point Register File (Stack) Operation*

Floating Point Stack With Register Renaming

FIG. 6

*Paired Register Exchange Extension Execution*

| Cycle | Translate | Register | Address | Floating Point Unit |
|---|---|---|---|---|
| 1 | *** | *** | *** | *** |
| 2 | FADD ST(0),ST(2) | | | *** |
| 2 | FXCH ST(4) | *** | *** | *** |
| 3 | *** | FADD ST(0), ST(2), ST(4) | *** | *** |
| 4 | *** | *** | FADD ST(0), ST(0), ST(2), ST(4) | *** |
| 5 | | | | FADD ST(0), ST(0), ST(2), ST(4) |

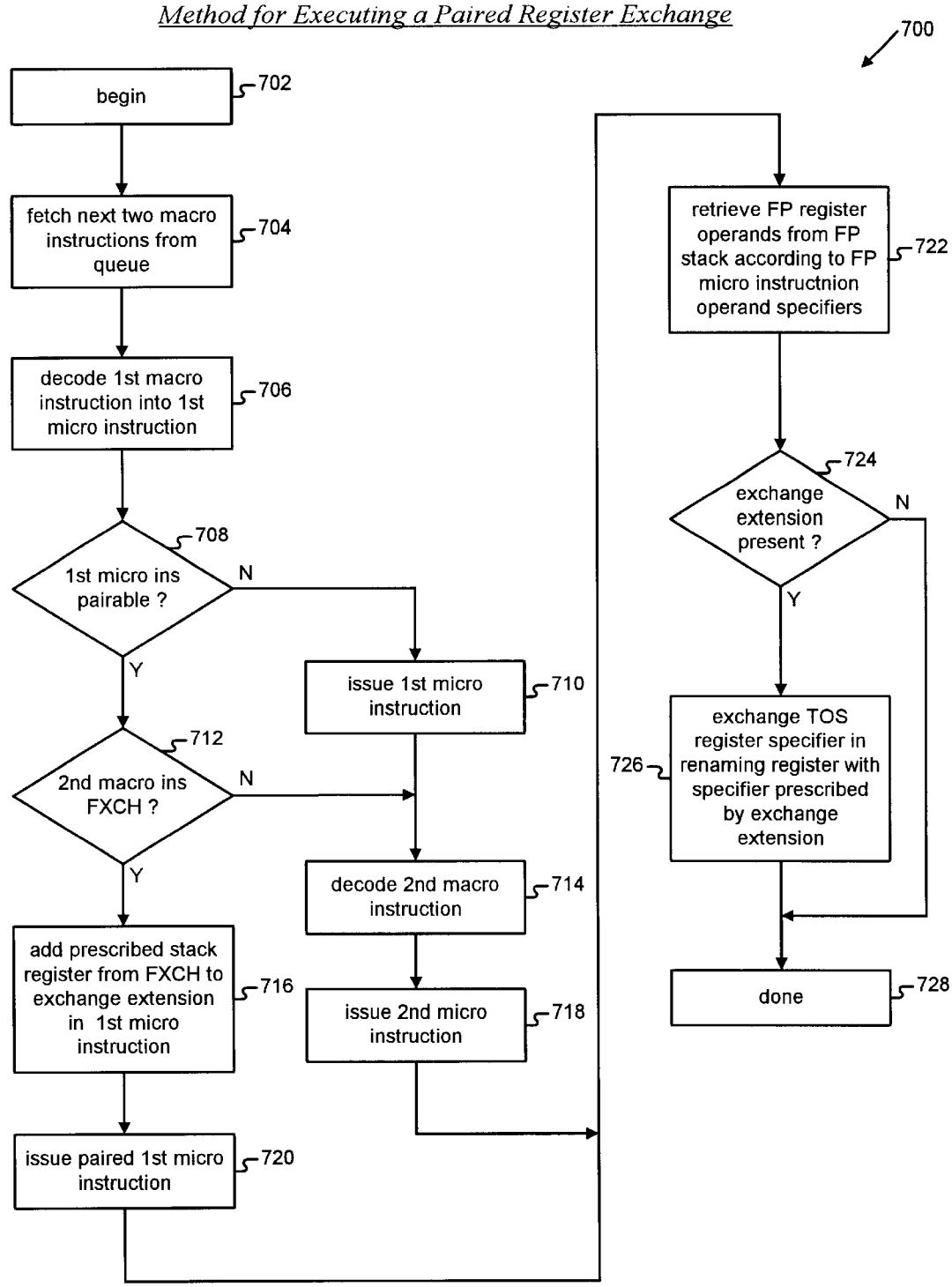

PAIRED REGISTER EXCHANGE USING RENAMING REGISTER MAP

BACKGROUND OF THE INVENTION

1. Field of the Invention

This invention relates in general to the field of instruction execution in computers, and more particularly to an apparatus in a pipeline microprocessor for accomplishing a register exchange operation in a floating point register stack.

2. Description of the Related Art

A microprocessor has an instruction pipeline that sequentially executes instructions from an application program in synchronization with a microprocessor clock. The instruction pipeline is divided into stages, each of which performs a specific task that is part of an overall operation that is directed by a programmed instruction. The programmed instructions in a software application program are to be executed in sequence by the microprocessor. As an instruction enters the first stage of the pipeline, certain subtasks are accomplished. The instruction is then passed to subsequent stages for accomplishment of subsequent subtasks. Following completion of a final task, the instruction completes execution and exits the final stage of the pipeline. Execution of programmed instructions by a pipeline microprocessor is very much likened to the manufacture of items on an assembly line.

Early microprocessors were not sophisticated so as to execute multiple instructions in different pipeline stages at the same time. In these microprocessors, a given instruction would be fetched from memory and would execute until the operation prescribed by the given instruction was completed. Following this, a next instruction would executed through completion.

As microprocessor uses and enabling technologies began to proliferate during the late 1970's, numerous approaches were proposed for dealing with the representation and computation of real number data. Whereas representation of whole number data was theretofore straightforward and unambiguous, representation of real numbers, i.e., numbers consisting of a mantissa, a decimal point, and an exponent, required standardization. Standardizing the representation and interpretation of real numbers within computer systems enabled microprocessor manufacturers to certify their microprocessors as capable of executing the more prevalently used software application programs. In the computer industry, whole numbers are referred to as integer data and real numbers are referred to as floating point data.

Because floating point data is markedly different from integer data, the early microprocessors did not even perform floating point computations on-chip. Rather, separate chips-floating point co-processors-were developed to be used in conjunction with these early microprocessors. Special programming codes were used in application programs to easily distinguish floating point instructions from integer instructions. When a floating point instruction was encountered in an instruction stream, it was immediately routed to the floating point co-processor for execution.

Today, even though advances in the art have more than enabled the incorporation of floating point co-processors into the same integrated circuits as their host microprocessors, integer instructions and floating point instructions are still processed architecturally in the same manner as before. Although floating point units reside on the same integrated circuit, the processing of floating point data is still treated as though the floating point units were separate. This is because the fundamental nature and formats of floating point data has not changed. It is still significantly different from integer data and a tremendous volume of legacy software is still in use.

One of the remnants of early designs which is still in use today is the logic used to store and access floating point data within a floating point unit. More specifically, rather than directly addressing a specific location in a floating point register file, floating point instructions specify register locations relative to a variable address called the top-of-stack register. In a stack register configuration, data is typically accessed in a last-in-first-out fashion. All new data is written to the top-of-stack register. As each new operand is placed on the top-of-stack, logic within the floating point unit itself changes a pointer to the top-of-stack so that it points to the next register. In like manner, most floating point instructions implicitly retrieve one of their operands from the top-of-stack. Within the floating point unit, as an operand is retrieved from the top-of-stack, the logic changes the address of the top-of-stack so that is points to the next previously stored data. Furthermore, the results of all floating point computations are placed on the top-of-stack. This implicit prescription of the top-of-stack register by virtually all floating point instructions was very useful in early microprocessor architectures. Today, is has proved to be very cumbersome.

Accessing data in a stack is cumbersome because sequential instructions in an application program do not necessarily use a previously computed result as an operand in a succeeding computation. And most floating point instruction sets account for this variation by providing an instruction that allows a programmer to direct the microprocessor to swap the contents of the top-of-stack with the contents of another stack register. This instruction, a floating point exchange instruction, allows a programmer to move a floating point data object from somewhere else in the floating point stack to the top-of-stack register, thus setting up the data for a following computation.

Use of the floating point exchange instruction is prolific. In fact, the present inventors have observed that a significant amount of code exists today that exhibits the following pattern of floating point operations and exchanges: OPERATION 1→EXHANGE→OPERATION 2→EXCHANGE→OPERATION 3→EXCHANGE→etc. One skilled in the art will appreciate that every other instruction in the pattern is an instruction that does not materially contribute to the computation of a final result; the exchanges are only present to move data around in an otherwise unwieldy register file.

Several attempts have been made in more recent years to improve the execution efficiency of floating point algorithms. Two approaches which directly relate to this application attempt to absorb the time it takes to perform a floating point exchange operation into the time it takes to perform another ongoing operation. The first approach-super-scalar architecture-provides two quasi-independent execution units within a single microprocessor. Complex dispatch logic analyzes streams of instructions entering the pipeline and routes instructions, often in parallel, to the two execution units. Results from the execution units are subsequently provided to reorder/retirement logic that reassembles the results in program order so they can be written to architectural registers. Within a super-scalar microprocessor, floating point exchange instructions are dispatched to one execution unit in parallel with another floating point instruction that is dispatched to the other execution unit, thus effectively performing the exchange operation in zero clock cycles.

The second approach has complex logic at the beginning of the pipeline to initially analyze sequences of incoming macro instructions. If a floating point exchange instruction is found between two floating point computational instructions (the optimum case), then the logic manipulates the source and destination register location specifiers in each of the two surrounding instructions so that the floating point exchange operation is accomplished as a result of executing the two computational instructions with the manipulated specifiers.

In either approach described above, the amount of hardware, and corresponding complexity, cost, and power consumption, to accomplish an exchange operation is significant, thus overly complicating the design of a pipeline microprocessor.

Therefore, what is needed is an apparatus in a pipeline microprocessor that allows an exchange operation to be performed in conjunction with another operation within a single floating point.

In addition, what is needed is a microprocessor that combines a floating point exchange operation with an adjacent floating point operation for parallel execution within the same floating point unit.

Furthermore what is needed is a method for pairing a floating point exchange operation with another floating point operation so that the exchange operation is accomplished in zero effective clock cycles.

SUMMARY

To address the above-detailed deficiencies, it is an object of the present invention to provide a pipeline microprocessor that performs a floating point exchange operation in parallel with another floating point operation within a single floating point.

Accordingly, in the attainment of the aforementioned object, it is a feature of the present invention to provide a microprocessor apparatus for performing a floating point exchange operation. The apparatus includes translation logic and floating point register logic. The translation logic receives an exchange macro instruction from a source therefrom, and provides a micro instruction extension that directs the microprocessor to perform the floating point exchange operation, where the micro instruction extension is paired with a micro instruction for parallel execution within a floating point unit. The floating point register logic is coupled to the translation logic. The floating point register logic receives the micro instruction and the micro instruction extension, and performs the floating point exchange operation in parallel with the operation directed by the micro instruction.

An advantage of the present invention is that floating point exchanges can be paired with other floating point operations within a single floating point execution unit; complex front-end logic or super-scalar logic is not required.

Another object of the present invention is to provide a microprocessor that pairs a floating point exchange operation with an adjacent floating point operation by adding an extension to a corresponding micro instruction that directs a floating point unit to perform the adjacent floating point operation during the same clock cycles within which it performs the floating point exchange operation.

In another aspect, it is a feature of the present invention to provide an apparatus in a pipeline microprocessor for executing a floating point exchange macro instruction, the floating point exchange macro instruction directing the microprocessor to exchange the contents of two floating point stack registers. The apparatus has an instruction decoder, an exchange micro instruction extension, and floating point logic. The instruction decoder receives the floating point exchange macro instruction and another macro instruction from a source therefrom, and pairs execution of the floating point exchange macro instruction with execution of the other macro instruction. The exchange micro instruction extension is provided by the instruction decoder and directs the microprocessor to perform the operation prescribed by the floating point exchange macro instruction, where the exchange micro instruction extension is paired with a micro instruction corresponding to the other macro instruction. The floating point logic is coupled to the instruction decoder. The floating point logic receives the micro instruction and the micro instruction extension, and executes the operation prescribed by the floating point exchange macro instruction in parallel with the operation prescribed by the other macro instruction.

In a further aspect, it is a feature of the present invention to provide a microprocessor for executing a floating point exchange operation in parallel with another operation within a single floating point execution unit. The microprocessor includes a translate queue, a translator, and floating point register logic. The translate queue buffers a floating point exchange macro instruction and another macro instruction for decoding. The translator is coupled to the translate queue. The translator decodes the floating point exchange macro instruction and the other macro instruction during a single clock cycle, and generates an exchange micro instruction extension corresponding to the floating point exchange macro instruction, and generates a micro instruction corresponding to the other macro instruction, and couples the exchange micro instruction extension to the micro instruction. The floating point register logic is coupled to the translator, and executes, in parallel, the floating point exchange operation and the other operation.

Another advantage of the present invention is that a less complex and less costly technique is provided for improving the execution speed of floating point software application programs.

Yet a further object of the present invention is to provide a method for pairing a floating point exchange operation with another floating point operation so that the exchange operation is accomplished in zero effective clock cycles.

In yet a further aspect, it is a feature of the present invention to provide a method for executing a floating point exchange operation in parallel with another operation, the operations being performed within a single floating point execution unit in a pipeline microprocessor. The method includes decoding, in parallel, a floating point exchange macro instruction and another macro instruction, the floating point exchange macro instruction prescribing the floating point exchange operation and the other macro instruction prescribing the other operation; adding an extension to a micro instruction that prescribes the other operation, the extension prescribing the floating point exchange operation; and providing the micro instruction with the extension to the single floating point execution unit during the same clock cycle.

Yet a further advantage of the present invention is that a method is provided for significantly improving the performance of a pipeline microprocessor without having to add a great deal of hardware to its basic design.

BRIEF DESCRIPTION OF THE DRAWINGS

These and other objects, features, and advantages of the present invention will become better understood with regard to the following description, and accompanying drawings where:

FIG. 6 is a table illustrating execution of a paired floating point exchange instruction by the microprocessor of FIG. 4.

FIG. 7 is a flow chart illustrating a method according to the present invention for performing a paired register exchange operation within a single floating point execution unit.

DETAILED DESCRIPTION

In light of the above background on techniques for performing floating point exchange operations in a pipeline microprocessor, several related art examples will now be discussed with reference to FIGS. 1 through 3. These examples illustrate the deficiencies inherent in present day pipeline architectures. Whereas floating point exchanges comprise a significant portion of virtually all floating point software algorithms, microprocessor designers have attempted to develop techniques for accomplishing an exchange without incurring delays. And although some progress has been made, the extant techniques for improving the execution of a floating point exchange nevertheless fall short because they either require an additional execution stage in the microprocessor or they require complex translation logic. In addition, these present day approaches cannot be applied to all cases where floating point exchange operations arise within application programs. Following this discussion, a detailed description of the present invention will be provided with reference to FIGS. 4 through. 7. The present invention provides an apparatus and method for pairing a floating point exchange operation with another operation for parallel execution within a single floating point execution stage. The present invention requires neither an additional execution stage nor complex translation logic. Moreover, the apparatus and method according to the present invention are applicable to nearly all known floating point exchange cases.

Figure 1:
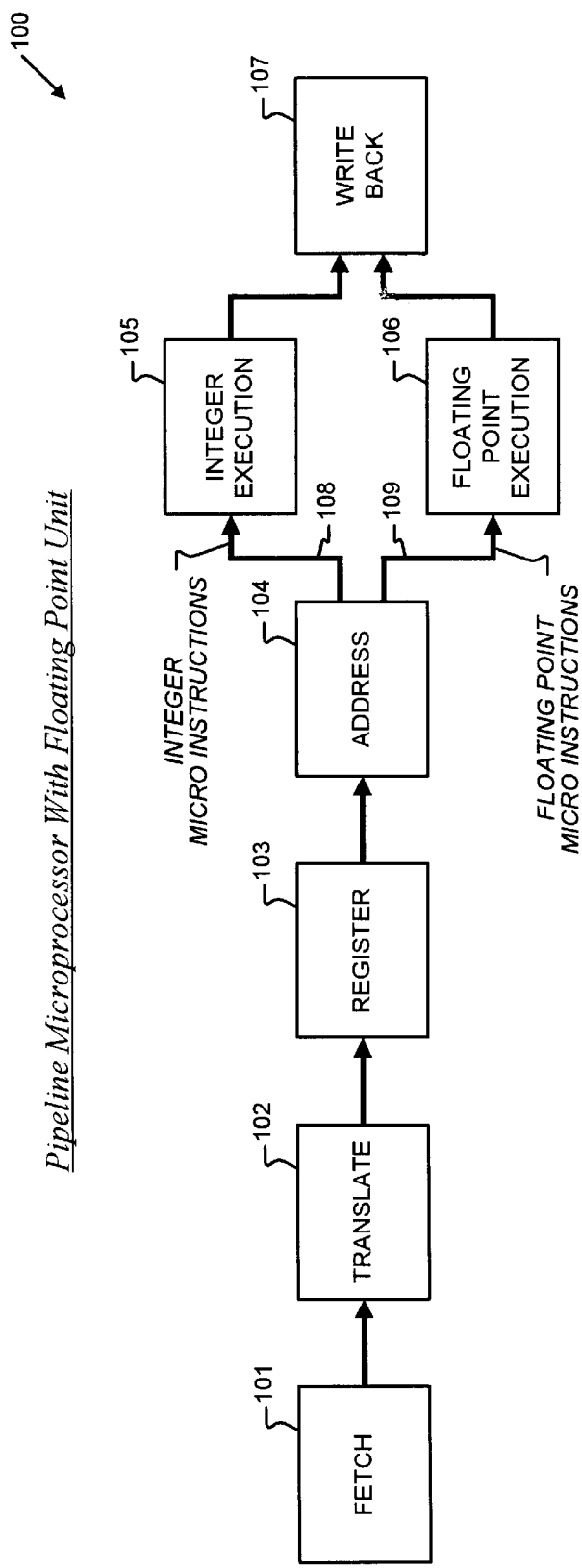
FIG. 1 is a block diagram illustrating stages of a related art pipeline microprocessor featuring an integer execution stage and a floating point execution stage.

Referring to FIG. 1, a block diagram is presented illustrating stages of a related art pipeline microprocessor 100 featuring separate integer and floating point execution stages. The microprocessor 100 has a fetch stage 101, translate stage 102, register stage 103, address stage 104, integer execution stage 105, floating point execution stage 106, and write back stage 107. The integer execution stage 105 and floating point execution stage 106 are in parallel.

Operationally, the fetch stage 101 fetches macro instructions from memory (not shown) that are to be executed by the microprocessor 100. The translate stage 102 sequentially translates, or decodes, the fetched macro instructions into associated micro instructions, each micro instruction directing logic within subsequent stages of the microprocessor 100 to perform a specific subtask related to accomplishment of the operation prescribed by a fetched macro instruction. The register stage 103 retrieves integer operands specified by the micro instructions from a register file (not shown) for use by subsequent stages in the pipeline. The address stage 104 calculates memory addresses specified by the micro instructions to be used in data storage and retrieval operations. The integer execution stage 105 either performs integer arithmetic logic unit (ALU) operations on data retrieved from the register file, or reads data from memory using the memory address calculated in the address stage 104, or writes data to memory using the memory address calculated in the address stage 104. The floating point execution stage 106 performs arithmetic, logical, and transcendental (e.g., sine, cosine, exponential) operations on operands of a particular type: floating point numbers. The write back stage 107 updates registers in the register file with results generated or retrieved by the integer execution stage 105, or with operands transferred from the floating point execution unit 106. Thus, macro instructions are fetched by the fetch stage 101, they are decoded into micro instructions by the translate stage 102, and the micro instructions proceed sequentially through subsequent stages 103–107 of the microprocessor 100. Micro instructions that prescribe floating point operations (i.e., floating point micro instructions) are routed to the floating point execution unit 106. All other micro instructions (i.e., integer micro instructions) are routed to the integer execution unit 105.

Micro instructions move through the stages 101–107 of the microprocessor pipeline in synchronization with a microprocessor clock. Optimally, while any given stage in the pipeline is executing a micro instruction, the previous stage should be executing the next micro instruction. If a stage in the pipeline requires more than one cycle of the pipeline clock to execute a given micro instruction, then flow of micro instructions through the microprocessor pipeline is temporarily stalled: preceding stages in the pipeline are precluded from forwarding operands down the pipeline and succeeding stages, having completed execution of a current micro instruction, sit idle. A stall in the pipeline is referred to as a slip or a void. Slips cause delays when application programs execute on the microprocessor 100.

Register files in early microprocessors were configured in a stack architecture in order to limit the number of bits required to represent macro instructions and micro instructions. In a register stack, operands are accessed last-in first-out (LIFO). More specifically, within a stack architecture a result is always written to the register that is at the top of the stack, and operands are always referenced relative to the top-of-stack register. To exploit the characteristics of stack configurations, early microprocessor instruction sets implicitly specified the top-of-stack register as both a destination register for results and as one of the registers from which source operands were to be accessed. Consequently, early instructions did not require bits to represent operand source or result destination registers.

Advances in the art over the years have enabled microprocessor designers to move register file designs for integer operations away from the stack architecture. But floating point instructions still continue to employ the stack model for three reasons. First, floating point operations in early computer systems were performed by separate devices known as co-processors, numeric co-processors, or floating point processors. In fact, floating point instructions were initially developed as a class of instructions completely separate from the remainder of a microprocessor's instruction set. Known as ESC (i.e., escape) instructions, an ESC character preceded each instruction in code for compilation or assembly, thus indicating that the ESC instruction was to be routed to an off-chip floating point unit rather than processed on board. Second, standards within the computing community have virtually fixed the format of floating point numbers within microprocessor architectures as 80-bit numbers. Whereas the format of integer numbers has been allowed to evolve with advances in technology, the format of floating point numbers remains constant. Third, a tremendous amount of legacy programs exist that employ these older floating point instructions.

Consequently, although today's design and fabrication techniques have enabled microprocessor designers to incorporate floating point processing logic within the same chip as the remainder of the microprocessor, for the reasons cited above, the floating point execution unit 106 is still kept architecturally separate from integer execution hardware 105. Thus, in a present day microprocessor 100 floating point operands are still stored and accessed in a floating point register stack. A floating point micro instruction is hence routed to the floating point unit 106 within which floating point operands are accessed from a floating point stack, the prescribed floating point operation is performed, and a corresponding result is written to the top-of-stack register. The configuration and operation of a floating point stack are more specifically described with reference to FIG. 2.

Figure 2:
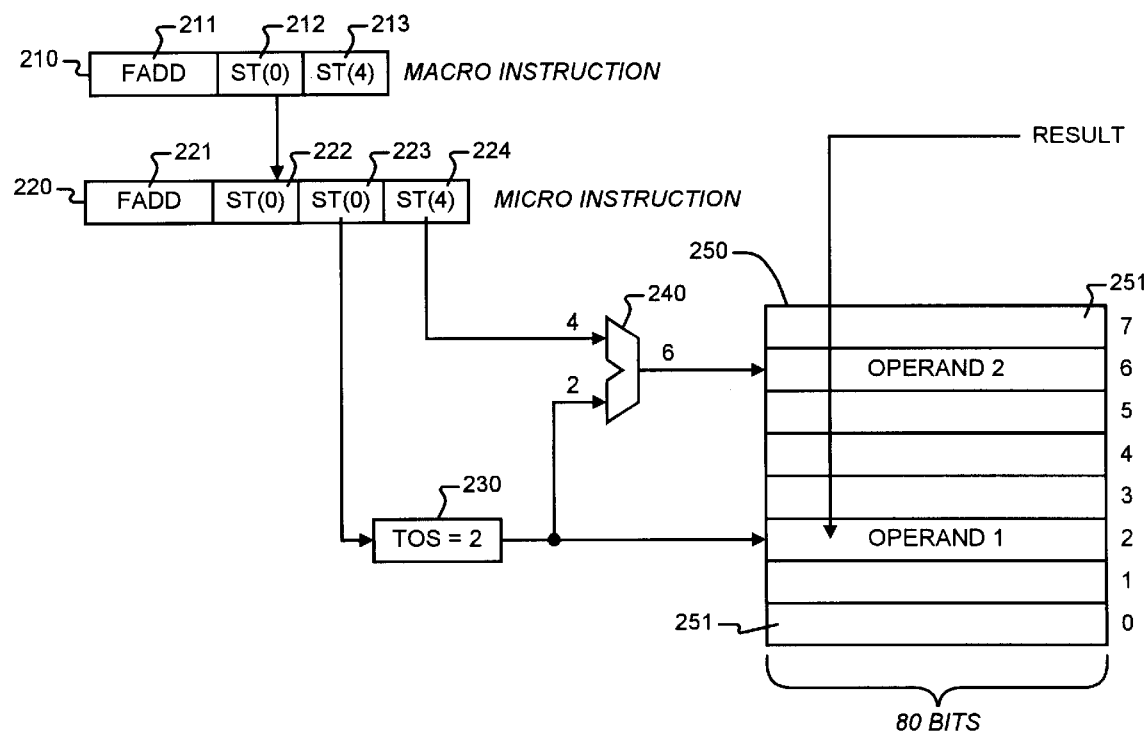
FIG. 2 is a block diagram illustrating how a floating point macro instruction references operands within a related art floating point register file.

Referring to FIG. 2, a block diagram 200 is presented illustrating how a floating point macro instruction 210 references operands within a related art floating point register file 250. The block diagram shows a floating point macro instruction 210 that is decoded by translation logic (not shown) into a corresponding floating point micro instruction 220. The floating point micro instruction 220 is routed as discussed above with reference to FIG. 1 to a floating point execution unit, within which resides a floating point register file 250, or floating point stack 250. An x86-compatible floating point register stack 250 consists of eight 80-bit floating point registers 251. Each of the registers 251 in the stack 250 have a unique absolute address, in this example noted as addresses 0 through 7. But although each of the registers 251 has a unique absolute address, neither the macro instruction 210 nor the micro instruction 220 reference the registers 251 by their absolute address. Rather, the registers 251 are referenced relative to a top-of-stack register 251, i.e., a register 251 whose absolute address is assigned and maintained by top-of-stack logic 230. The top-of-stack logic 230 changes the absolute address of the top-of-stack register 251 each time a floating point operand is placed on to the stack 250 or removed from the stack 250. In this example, the pseudo codes used for the macro instruction 210, micro instruction 220, and the size of the floating point stack 250 conform to those found in an x86-compatible microprocessor, however, one skilled in the art will understand that the ensuing discussion applies to all present day microprocessors that employ a floating point stack 250.

Operationally, when an operand is written to the stack 250, it is placed in the register 251 whose absolute address, or location, is indicated by the top-of-stack logic 230. In conjunction with the write, the top-of-stack logic 230 increments (or decrements) the top-of-stack register designation to point to the following register 251. Similarly, when an operand is retrieved from the stack, the top-of-stack logic 230 decrements (or increments) the address value to designate the previous register as the new top-of-stack register 251. A micro instruction 220 must reference the other stack registers 251 relative to the top-of-stack register 251, such as ST(4) (i.e., top-of-stack plus 4). More specifically, FIG. 2 depicts a current top-of-stack register 251, ST(0), as being at absolute register address 2. The register 251 holding OPERAND 2, ST(4), is four addresses above the current top-of-stack register 251. Hence, a two-input adder 240, or similar device, is provided to compute the absolute addresses of registers 251 that are prescribed relative to the top-of-stack 251. The adder 240 receives the top-of-stack address from the top-of-stack logic 230 and adds to it a relative reference received from the micro instruction 220. The modulo-8 sum of the top-of-stack address and the relative reference is the absolute address of the stack register 251 prescribed by the relative reference.

Thus, a floating point macro instruction 210 is fetched from memory (not shown) and is provided to an instruction decoder (not shown) within the translate stage of the microprocessor. The floating point macro instruction 210 typically has three fields: a macro opcode field 211, a destination/$1^{st}$ source field 212, and a $2^{nd}$ source field 213. More specifically, the floating point macro instruction 210 used in this example is a floating point add instruction 210. The macro opcode 211, FADD, directs that two operands be retrieved from the stack 250 and summed together. Operand 1 is prescribed in the destination/$1^{st}$ source field 212 as the operand residing in the top-of-stack register 251, ST(0). Operand 2 is prescribed in the $2^{nd}$ source field 213 as the operand residing in the register 251 offset from the top-of-stack register 251 by 4. For illustrative purposes, the stack architecture of FIG. 2 employs an incrementing scheme to determine the absolute address of registers 251 reference relative to the top-of-stack register 251, however, one skilled in the art will understand that a decrementing scheme can just as well be employed. In addition, the macro instruction 210 directs the floating point execution logic store the result of the addition in the top-of-stack register 251, ST(0), as indicated in the destination/$1^{st}$ source field 212.

The macro instruction 210 is decoded into a corresponding micro instruction 220 by translation logic (not shown). The micro instruction 220 has four fields: a micro opcode field 221, FADD; a destination field 222, ST(0); a source 1 field 223, ST(0); and a source 2 field 224, ST(4). The number of fields 221–224 and the specific format of a micro instruction 220 are typically unique to the design of a specific microprocessor. One skilled in the art will appreciate, however, that the format of the micro instruction 220 shown in FIG. 2 is representative of that provided by present day microprocessors.

The micro instruction 220 is routed to the floating point execution unit. The source 1 field 223, ST(0), is provided to the top-of-stack logic 230 to determine which register 251 holds OPERAND 1, in this example, register 2 251. The source 2 field 224, ST(4), is provided to the adder 240 to compute the absolute address of the register 2S1 that contains OPERAND 2, in this example, register 6. After the operands prescribed by the micro instruction 220 are retrieved from the stack 250, execution logic (not shown) computes the sum and places the result in the current top-of-stack register 251 at absolute address 2. Consequently, OPERAND 1 no longer exists in the top-of-stack register 251 after the result is written back into the stack 250.

Now, if a following floating point operation needs an operand that is in the top-of-stack register 251, then a micro instruction prescribing the following floating point operation can immediately follow the floating point add micro instruction 220. But, if the following floating point operation requires an operand or two operands that are in registers 251 other than the current top-of-stack register 251, then the contents of the stack 250 must first be rearranged so that one of the required operands for the following floating point operation is in the top-of-stack register 251. This is because, as alluded to above, floating point macro instructions are limited in the sense that at least one of their operands must be in the top-of-stack register 251. Because of this limitation, present day microprocessors provide floating point exchange macro instruction.

A floating point exchange macro instruction directs the microprocessor to swap the contents of a prescribed floating point register 251 with the contents of the top-of-stack register 251, thus allowing a desired operand to be moved to the top-of-stack 251 so that it is in place for retrieval by the following floating point micro instruction. Floating point exchange instructions are prolifically utilized in floating point software programs, primarily because lots of floating point algorithms do not use the result of one operation as an operand for a next operation. Hence, it is very common to find a pattern of floating point operations as follows: OPERATION 1→EXCHANGE→OPERATION 2→EXCHANGE→OPERATION 3→ETC. Conduct of a floating point exchange operation along with an improvement found in many microprocessors to speed up the exchange operation is illustrated in FIG. 3.

Figure 3:
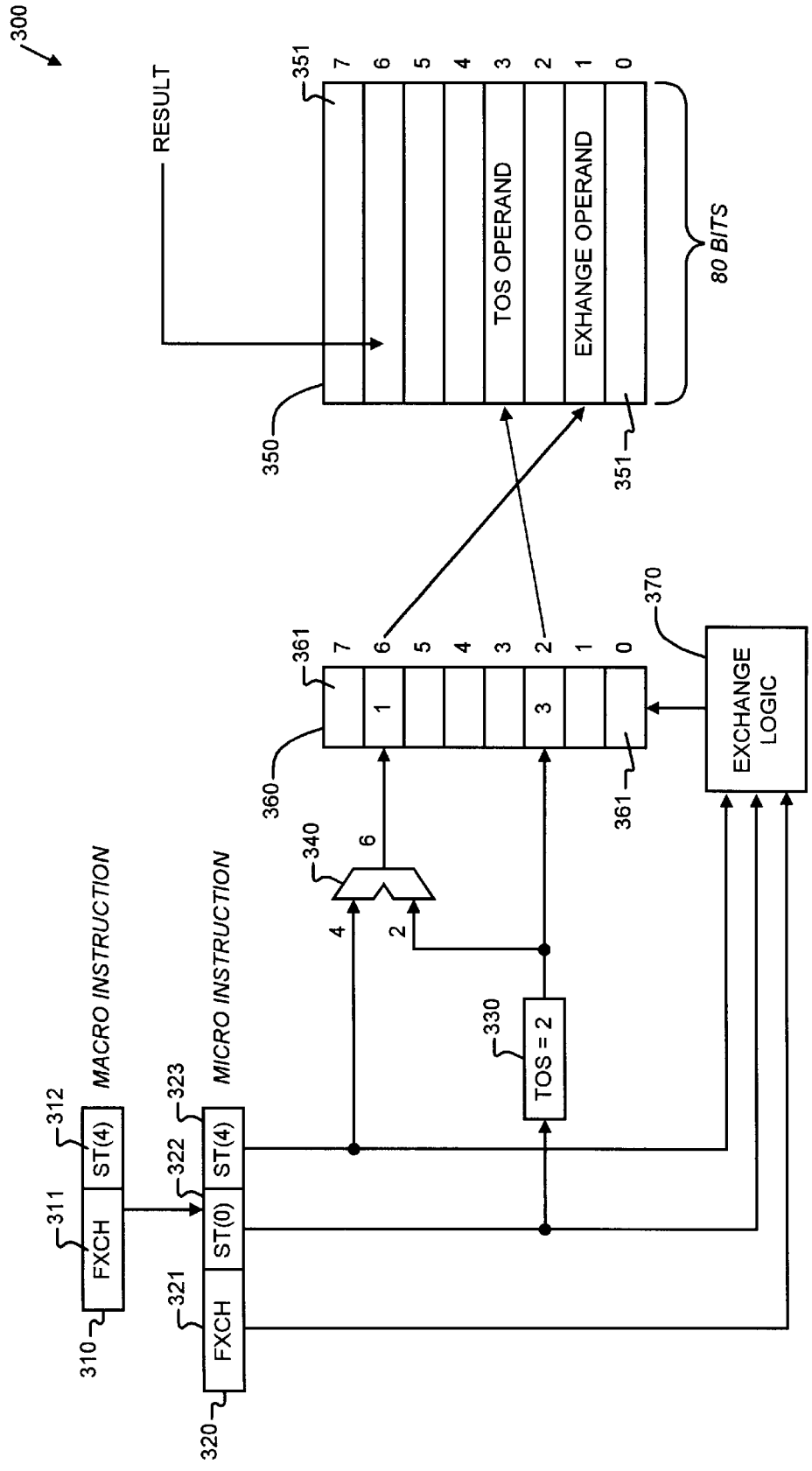
FIG. 3 is a block diagram illustrating how a floating point exchange instruction executes within a related art floating point execution unit that employs register renaming.

Referring to FIG. 3, a block diagram 300 is provided depicting how a floating point exchange instruction executes within a related art floating point execution unit that employs register renaming. The block diagram 300 includes a floating point macro instruction 310 that is decoded by translation logic (not shown) into a corresponding floating point micro instruction 320. The floating point micro instruction 320 is routed as discussed above with reference to FIG. 1 to a floating point execution unit, within which resides a floating point register stack 350. The floating point register stack 350 consists of eight 80-bit floating point registers 351 having absolute addresses 0 through 7. The block diagram 300 also includes top-of-stack logic 330 and an adder 340 for computation of register addresses other than the top-of-stack register 351. Additionally, the block diagram 300 shows logic commonly used to improve the execution speed of a floating point exchange operation: a renaming register 360 and exchange logic 370.

The basic operation of the elements shown in FIG. 3 is similar to that discussed with reference to FIG. 2, the hundreds digit being replaced with a 3. Both the macro instruction 310 and micro instruction 320 reference registers 351 relative to the top-of-stack designation provided by the top-of-stack logic 330. But the top-of-stack logic 330 and adder 340 of FIG. 3 do not point to specific registers 351 in the floating point stack 350. Instead, they 330, 340 point to registers 361 in the renaming register file 360. It is the contents of renaming registers 361 that point to specific registers 351 in the stack 350. For example, the top-of-stack logic 330 indicates that the current top-of-stack is register 2 361 in the renaming register file 360. Register 2 361 points to register 3 351 in the stack array 350. Likewise, the adder 340 in this example points to renaming register 6 361, which in turn points to stack register 1 351. Why this level of intermediate logic 360, 370? Essentially, the extra logic 360, 370 is provided to expedite the vast number of register exchange operations. Whereas to swap operands in the stack 250 discussed with reference to FIG. 2 requires complex logic to both read and write two 80-bit registers 251, an exchange is accomplished by the logic 360, 370 shown in FIG. 3 by merely swapping the contents of two locations 361 in the renaming register file 360. For a stack 350 consisting of eight registers 351, the registers 361 in the register file 360 need be only 3-bits wide. One skilled in the art will appreciate that the logic 370 and commensurate clock cycles required to swap the contents of two 3-bit registers 361 is much less than that required to swap the contents of two 80-bit registers 351. Thus, the fundamental purpose of a renaming register file 360 is to allow an exchange operation to be performed simply, in most microprocessors this means within a single clock cycle.

An x86-compatible floating point exchange macro instruction 310, FXCH, is shown in the block diagram 300.

Like most floating point macro instructions, the floating point exchange macro instruction 310 only has two fields: a macro opcode field 311 directing the exchange operation and an exchange register field 313, designating the register 351, ST(4), whose contents are to be exchanged with the contents of the top-of-stack register 351. The exchange macro instruction 310 is translated by instruction decoding logic (not shown) into a floating point exchange micro instruction 320. The floating point exchange micro instruction 320 typically has three fields: a micro opcode field 231 directing the exchange operation, a $1^{st}$ register field 322 designating the top-of-stack register 351, ST(0), and a $2^{nd}$ register field 323 designating the exchange register, ST(4).

When a floating point exchange micro instruction 320 enters a floating point execution unit as depicted in FIG. 3, the micro opcode field 321, $1^{st}$ register field 322 and exchange register field 323 are all provided to the exchange logic 370. During the clock cycle within which the exchange operation itself is to be performed, rather than swapping the contents of the prescribed stack registers 351, the exchange logic 370 actually swaps the contents of the renaming registers 361 that point to the two prescribed stack registers 351. In this example, the contents of registers 2 361 and 6 in the renaming register file 360 would be swapped, thus causing the top-of-stack logic 330 to point to absolute stack address 1 as the new top-of-stack register 351 following the exchange. By employing register renaming, microprocessor designers have been able to significantly decrease the number of clock cycles that are required to rearrange the contents of a floating point stack 350.

Improvements notwithstanding, one skilled in the art will appreciate however that floating point exchanges per se are essentially overhead operations that are required only by virtue of the stack architecture. That is, floating point exchanges do not compute intermediate results; they merely rearrange data so that intermediate results can be computed. Because of this, microprocessor designers, in their quest to streamline the execution of floating point algorithms within pipeline microprocessors are now striving to develop techniques that eliminate the clock cycles required to perform exchanges altogether.

One such technique "super-scalar architecture" is employed in the Intel Pentium® microprocessor. In essence, a super-scalar architecture is one that has more than one execution unit. The Pentium architecture has two execution units to which integer micro instructions may be routed, thus allowing for parallel execution. Only one of the execution units, however, is capable of executing floating point instructions. This is a different and more complex design that that shown in FIG. 1. The microprocessor 100 of FIG. 1 has a floating point execution unit 106 that is only capable of processing floating point instructions; it is not capable of processing integer instructions. In the case of the Pentium though, although only one of its two execution units is capable of executing floating point instructions, it allows a floating point exchange instruction to execute in the parallel execution unit. Thus, the super-scalar technique provides for a floating point exchange micro instruction that can execute in the parallel execution unit while another floating point micro instruction executes in the execution unit that is floating point capable. When such pairing takes place, the observable result is that the floating point exchange takes zero clock cycles to execute.

But to provide the level of parallelism exhibited by the Pentium microprocessor costs a great deal in hardware. Rather than routing floating point instructions directly to a floating point unit and integer instructions directly to an integer unit, like the microprocessor 100 of FIG. 1, the Pentium routes all decoded micro instructions to logic that must analyze the micro instructions and subsequently dispatch them to the two parallel execution units according to a complex set of pairing rules. Following execution, results generated by dispatched micro instructions must be reassembled in program order by reorder/retirement logic so that the results can properly be written back into architectural registers.

Therefore, to achieve a zero-cycle exchange under the super-scalar approach, a designer is forced to accept the hardware complexity, cost, and heavy power consumption of a super-scalar microprocessor.

A second technique, developed by Blomgren, for improving the execution speed of a floating point exchange instruction is described in U.S. Pat. No. 5,634,118 entitled Splitting a Floating-Point Stack Exchange Instruction for Merging Into Surrounding Instructions by Operand Translation. In his patent, Blomgren provides complex translation logic to analyze sequential macro instructions as they are fetched from memory. If the proper cases are detected to expedite the execution of a floating point exchange instruction, then Blomgren's translation apparatus manipulates the source and destination register references in the sequential macro instructions to either partially or totally eliminate the floating point exchange instruction. For example, suppose a first floating point instruction, FADD ST(0),ST(1), is followed by a floating point exchange instruction, FXCH ST(4), which is followed by a second floating point instruction, FADD ST(0),ST(6). Blomgren's translation apparatus analyzes the three macro instructions and modifies the operands in the first and second macro instructions which would otherwise be decoded to yield the following sequence of micro instructions: FADD ST(4),ST(0),ST(1) followed by FADD ST(0),ST(4),ST(6), thus eliminating the requirement to issue a floating point exchange micro instruction.

In the case where a floating point exchange instruction is only preceded by or followed by a single floating point instruction, Blomgren's invention requires an additional move micro instruction to be issued to either set up or complete the exchange operation. Blomgren asserts that the generation of an additional move micro instruction rather than a floating point exchange micro instruction is still beneficial in a super-scalar architecture because floating point exchange micro instructions require 3 clock cycles to execute whereas move micro instructions only require one clock cycle.

But Blomgren's invention has a problem. complex translation logic is required to analyze sequential macro instruction sequences and to manipulate the source and destination operands in the generated micro instructions. And one skilled in the art will acknowledge that translation logic is perhaps one of the more critical speed bottlenecks already in present day pipeline architectures. To increase the complexity of a translator to perform operand substitution would tend to unnecessarily degrade the overall performance of a microprocessor merely to expedite the performance of one instruction.

Whether super-scalar architecture is employed or whether operand substitution is used, achieving zero-cycle performance for a floating point exchange instruction proves to be very costly in hardware terms. Either the logic required for super-scalar performance is required, viz., dispatch logic and reorder/retirement logic, or Blomgren's complex translation logic is needed. Both of these approaches add complexity and cost to a basic pipeline design.

The present invention overcomes the limitations of current floating point exchange techniques by providing an apparatus and method for pairing a floating point exchange micro instruction with another floating point instruction for execution within a single floating point execution unit. The present invention is described in detail with reference to FIGS. 4 though 7.

Figure 4:
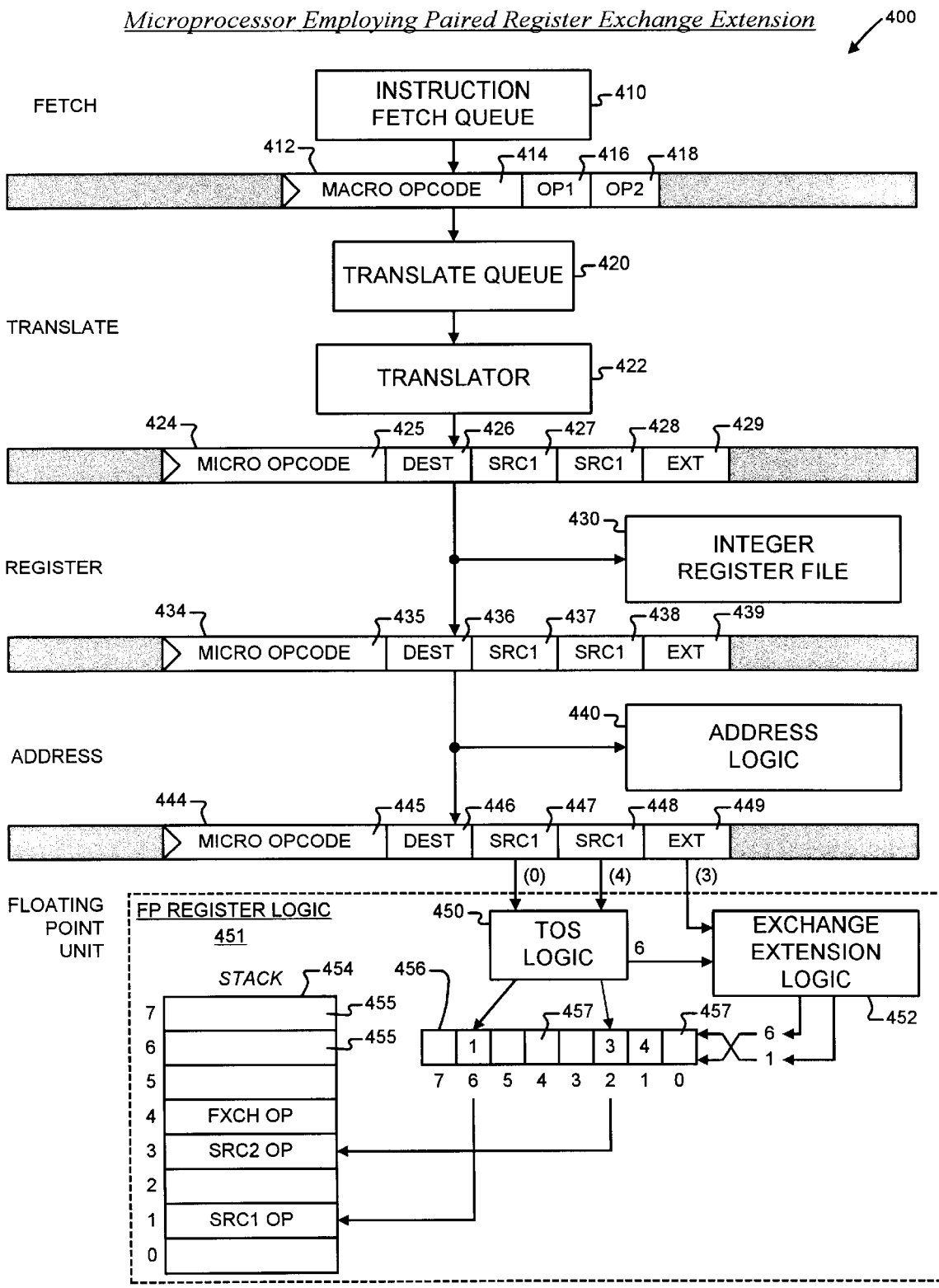
FIG. 4 is a block diagram of a microprocessor according to the present invention for pairing the execution of floating point exchange instructions with the execution of other macro instructions within a single floating point execution unit.

Referring to FIG. 4, a block diagram is presented of a microprocessor 400 according to the present invention for pairing the execution of floating point exchange instructions with the execution of other macro instructions within a single floating point execution unit. The microprocessor 400 includes pipeline stages similar to those discussed with reference to FIG. 1: fetch, translate, register, address, integer execute (not shown), floating point execute, and write back (not shown). For clarity of discussion, the integer execute and write back stages are not shown. The microprocessor 400 has an instruction fetch queue 410 that provides macro instructions to a macro instruction buffer 412. The macro instruction buffer 412 provides the macro instructions to a translate queue 420. The translate queue 420 provides buffered macro instructions to a translator 422, or instruction decoder 422. The translator 422 decodes macro instructions into associated micro instructions which are placed in a micro instruction buffer 424. In the microprocessor 400 according to the present invention, in addition to the other fields 425–428 typically provided in the micro instruction buffer 424, an exchange extension field 429 is provided. The exchange extension field 429 provides a means whereby a floating point exchange register specifier can be routed down the pipeline along with another micro instruction for parallel execution in the floating point unit. Micro instructions are routed through the register stage to an integer register file 430 and to buffer 434. Following the register stage, micro instructions are routed from buffer 434 to address logic 440 and buffer 444. Floating point micro instructions are routed from buffer 444 to the floating point execution unit. Integer micro instructions are routed to the integer execution unit (not shown). The floating point execution unit has floating point register logic 451 that includes top-of-stack logic 450, exchange extension logic 452, a renaming register file 456, and a floating point stack 454. The top-of-stack logic 450 receives operand specifiers from fields 447, 448 of buffer 444. The operand specifiers prescribe stack registers 455 in the floating point stack 454 relative to a register 455 designated as the top-of-stack register by the top-of-stack logic 450. The top-of-stack logic 450 also computes the location of prescribed registers 455 other than the top-of-stack 455. The top-of-stack logic 450 actually points to renaming registers 457 in the renaming register file 456, which in turn point to stack registers 455. The exchange extension logic 452 receives the exchange extension specifier from exchange extension field 449 in buffer 444 and provides control outputs to the renaming register file 456.

In operation, macro instructions are fetched from memory (not shown) into the instruction fetch queue 410. In synchronization with a pipeline clock, the fetched macro instructions are issued to the macro instruction buffer 412. The macro instruction buffer 412 has a macro opcode field 414, first source operand field 416, and second source operand field 418. In the case of a floating point macro instruction, its macro opcode is placed in the macro opcode field 414, its destination/$1^{st}$ source specifier is placed in the first source operand field 416, and its $2^{nd}$ source specifier is placed in the second source operand field 418. For a floating point exchange macro instruction, field 418 is empty.

The translate queue 420 provides a means whereby macro instructions can be buffered so that the translator 422 can access several macro instructions during a single clock cycle. In one embodiment, the translator 422 accesses three macro instructions during a single clock cycle. Macro instructions are buffered in the translate queue 420 during periods when stalls are incurred by later stages in the pipeline. During these stalls, although the translator 422 is precluded from issuing micro instructions to the register stage, the translate stage is not precluded from filling the translate queue 420.

In one embodiment, during a single clock cycle, the translator 422 can access up to three macro instructions from the translate queue 420. If a floating point exchange macro instruction is encountered, and if the macro instruction adjacent to the floating point exchange macro instruction is a floating point instruction, then the translator 422 pairs the floating point exchange operation for parallel execution in the floating point unit with the floating point operation specified by the adjacent macro instruction. In one embodiment, the floating point exchange macro instruction must immediately follow the floating point instruction to which it is paired. In an alternative embodiment, the floating point exchange instruction must immediately precede the floating point instruction to which it is paired.

In either embodiment described above, the other floating point macro instruction is decoded by the translator 422 into an associated floating point micro instruction. The micro opcode for the floating point micro instruction is provided in the micro opcode field 425 of the micro instruction buffer 424, and the instruction's destination stack register and two source stack registers are specified relative to the top-of-stack register 455 in fields 426–428. If the other floating point micro instruction is to be executed alone, then the exchange extension field 429 is left empty. If a floating point exchange operation is to be executed in parallel with the other floating point micro instruction, then the translator prescribes an exchange register 455 in the exchange extension field 429. The exchange register 455 is specified relative to the top-of-stack register 455.

As micro instructions proceed through the register stage, integer source operands are fetched from the integer register file 430 and provided in buffers (not shown) for use by subsequent pipeline stages.

The address logic 440 in the address stage, if required, computes addresses in memory of operands prescribed by micro instructions provided from buffer 434. Theses addresses are provided in address buffers (not shown) for use by subsequent pipeline stages.

The register stage and address stage of the microprocessor 400 according to the present invention are shown only to provide the relative location of the floating point unit. One skilled in the art will appreciate that floating point operational instructions do not access the integer register file 430 or the address logic 440.

When a paired floating point exchange micro instruction is routed from buffer 444 to the floating point unit, the operand specifies for the other floating point operation are routed to the top-of-stack logic 450. In this example, the top-of-stack register 455 is identified by renaming register 6 457 in the renaming register file 456. The top-of-stack logic 450 also indicates the top-of-stack to the exchange extension logic 452. The exchange register specifier is retrieved by the exchange extension logic 452 from field 449 of the micro instruction buffer 444. To effect the exchange, the exchange extension logic 452 computes the absolute address of the renaming register 457 that points to the register 455 specified to be exchanged with the top-of-stack register 455. In one embodiment, the exchange logic 452 swaps the contents of the two renaming registers 457 immediately after they are accessed to indicate operands specified by the other floating point micro instruction. The operands prescribed by the other floating point micro instruction are subsequently fetched from the stack 454.

For a stack 454 consisting of eight 80-bit registers 455, fields 457 within the renaming register 456 need be only 3-bits wide. Hence, the logic is trivial to implement the exchange operation such that it is accomplished in a single clock cycle. In addition, 3-bit extension fields 429, 439, 449 are required in buffers 424, 434, 444. Thus, only minor hardware additions are required to implement a zero-cycle floating point exchange operation in the microprocessor 400 according to the present invention.

Figure 5:
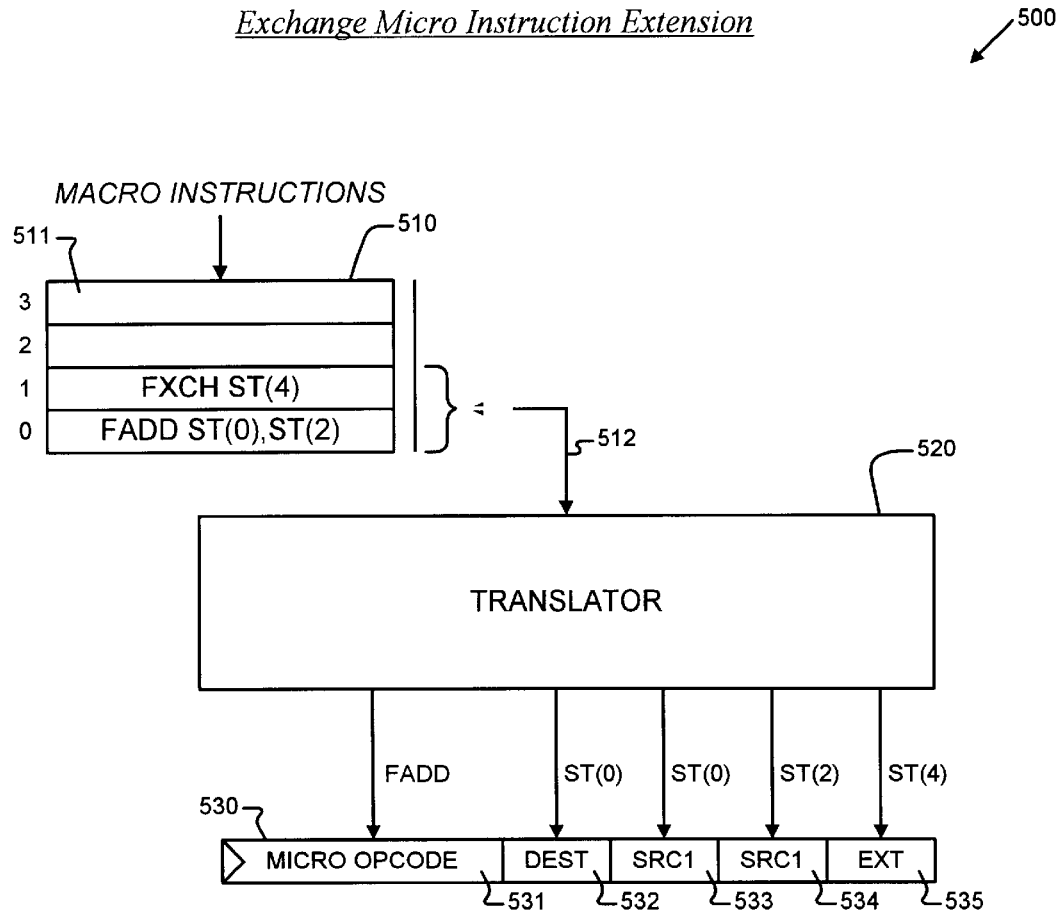
FIG. 5 is a block diagram depicting generation of a paired register exchange micro instruction extension by the microprocessor of FIG. 4.

Now referring to FIG. 5, a block diagram 500 is presented depicting generation of a paired register exchange micro instruction extension by the microprocessor 400 of FIG. 4. The block diagram 500 shows an instruction decoder 520 that is fetching macro instructions from a translate queue 510. In one embodiment, the translate queue has four queue entries 511. The translator 520 provides outputs to fields 531–535 in a micro instruction buffer 530. The embodiment discussed with respect to this block diagram 500 depicts generation of a micro instruction and exchange extension to perform a floating point addition operation in parallel with a floating point exchange operation. All of the operations described hereinafter with reference to FIG. 5 are accomplished by the microprocessor 400 during a single pipeline clock cycle.

During the first part of the cycle, the translator 520 fetches the first two entries 511 from the translator queue 510. The first entry 511 is a floating point add macro instruction, FADD ST(0),ST(2), directing the microprocessor 400 to add the contents of the top-of-stack (TOS) register with the contents of a stack register having the address TOS+2. The second entry 511 is a floating point exchange macro instruction, FXCH ST(4), directing the microprocessor 400 to swap the contents of the TOS register with the contents of a stack register located at TOS+4.

In the embodiment illustrated in the block diagram 500, the translator determines that the exchange can be paired with the floating point addition operation. Hence, the micro opcode corresponding to a floating point add operation, FADD, is generated and placed in field 531 of the micro instruction register 530. ST(0) is placed in the destination field 532 designating the TOS register as the destination register for the add result. ST(0) and ST(2) are placed in fields 532 and 533, thus designating the two source operands for the add operation. And ST(4) is placed in the exchange extension field 535, thus designating register ST(4) as the exchange register whose contents are to be swapped with the contents of the TOS register.

Now referring to FIG. 6, a table 600 is presented illustrating execution of a paired floating point exchange instruction by the microprocessor 400 of FIG. 4. The table depicts activities in the translate, register, address, and floating point stages only. For clarity of discussion, the remaining stages of the microprocessor 400 are not depicted. The table illustrates an alternative embodiment of the present invention where a floating point exchange micro instruction immediately precedes another floating point macro instruction in the instruction sequence. Progression of the instructions through the stages of the pipeline is shown with respect to cycles of a pipeline clock. Instructions preceding and following the instructions of interest to this discussion are indicated by "***".

During cycle 2, two macro instructions are provided to a translator 422 according to the present invention. The first macro instruction is a floating point exchange instruction, FXCH ST(4), directing the microprocessor 400 to exchange the contents of stack register TOS+4 455 with the contents of the TOS stack register 455. The second macro instruction is a floating point add instruction, FADD ST(0),ST(2), directing the microprocessor 400 to sum the contents of registers TOS 455 and TOS+2. During this cycle the instruction decoder 422 detects that the two operations can be paired for parallel execution in the floating point unit. Hence, the FADD instruction is decoded into an associated FADD micro instruction prescribing ST(0) as destination field 426, ST(0) as a first source field 427, and ST(2) as a second source field 428. In addition, ST(4) is prescribed in the exchange extension field 429.

During cycle 3, the paired micro instruction proceeds through the register stage. The exchange extension field 601 is routed through this stage in parallel with the FADD micro instruction. In addition during cycle 3, a next instruction proceeds through the translate stage.

During cycle 4, the paired exchange micro instruction proceeds through the address stage. Following this stage, the paired micro instruction will be routed to the floating point execution unit rather than the integer execution unit.

During cycle 4, the paired exchange micro instruction proceeds through the floating point stage. Therein, during the early part of the clock cycle, the exchange extension logic 452 detects that an exchange operation is to be performed from the contents of exchange extension field 449. The exchange extension logic 452 thus swaps the contents of the two 3-bit renaming registers 457 in the renaming register file 456 that point to the TOS register 455 and register TOS+4 455. Also during cycle 4, following the swap, the two source operands relatively prescribed by ST(0) and ST(2) are retrieved from the stack 454 and the addition operation is performed.

The present invention provides several advantages over current techniques for performing floating point exchanges. First, since typical pipeline microprocessors already employ some type of floating point renaming register scheme, all that is required to eliminate the clock cycles that correspond to exchange operations is the addition of micro instruction extension fields to carry the paired exchange register specifier and configuration of exchange extension logic to detect and execute the a swap during the same clock cycle that another floating point instruction executes. Second, the present invention accomplishes a zero-cycle exchange in a single floating point unit; the complex logic needed to implement a super-scalar architecture is not necessary. Third, the present invention does not require complex translation logic to support operand specifier substitutions as Blomgren proposes. Fourth, the microprocessor according to the present invention provides the unique capability to rapidly combine the commonly observed strings of macro operations where exchanges alternate between floating point computational instructions.

Now referring to FIG. 7, a flow chart 700 is presented illustrating one embodiment of a method according to the present invention for performing a paired register exchange operation within a single floating point execution unit.

Flow begins at block 702, where macro instructions are buffered for decoding within a translator queue according to the present invention. Flow then proceeds to block 704.

At block 704, a translator according to the present invention fetches the next two macro instructions from the queue. Flow then proceeds to block 706.

At block 706, the first macro instruction is translated by the instruction decoder into an associated first micro instruction. Flow then proceeds to decision block 708.

At decision block 708, the first micro instruction is evaluated to determined if it can be paired for execution with a following micro instruction. In one embodiment, all floating point computational micro instructions can be paired for parallel execution with an exchange operation. If the first micro instruction can be paired, then flow proceeds to decision block 712. If it cannot be paired, then flow proceeds to block 710.

At block 710, the first micro instruction is issued for stand-alone execution. Flow then proceeds to block 714.

At decision block 712, since the first micro instruction can be paired, the second macro instruction is evaluated to determine if it is a floating point exchange macro instruction. If so, flow proceeds to block 716. If not, flow proceeds to block 714.

At block 714, the second macro instruction is decoded into an associated second micro instruction. Flow then proceeds to block 718.

At block 718, the second micro instruction is issued for stand-alone execution. Flow then proceeds to block 722.

At block 716, since the floating point exchange specified by the second macro instruction can be paired with the first micro instruction, the translator prescribes, in an exchange extension field according to the present invention, the stack register whose contents are to be swapped with the contents of the top-of-stack register. The exchange extension field is appended to the first micro instruction for parallel execution. Flow then proceeds to block 720.

At block 720, the paired exchange micro instruction is issued for parallel execution in a floating point unit according to the present invention. Flow then proceeds to block 722.

At block 722, within a floating point unit according to the present invention, operand specifiers from a retrieved micro instruction cause prescribed operands for a floating point operation to be retrieved from the floating point stack. Flow then proceeds to decision block 724.

At decision block 724, the exchange extension field of a micro instruction according to the present invention is evaluated to determine if a paired exchange operation is directed. If so, then flow proceeds to block 726. If not, then flow proceeds to block 728.

At block 726, since the exchange extension directs a paired exchange operation, the contents of the renaming register corresponding to the top-of-stack register are swapped with the contents of the renaming register corresponding to the stack register prescribed by the exchange extension field, thus accomplishing the swap during the same clock cycle as the operation prescribed by the first macro instruction. Flow then proceeds to block 728.

At block 728, the method completes.

Although the present invention and its objects, features, and advantages have been described in detail, other embodiments are encompassed by the invention. For example, the present invention has been particularly characterized in terms of a microprocessor having a single floating point unit. However, super-scalar architectures can benefit as well from the technique provided by the present invention. The present invention affords a more effective way of pairing a floating point exchange with another floating point operation within the same floating point unit. A super-scalar microprocessor as described above would be capable of perhaps executing an integer instruction in its other execution unit during the same clock cycles that it is executing a paired exchange instruction in its floating point capable unit.

In addition, the present invention has been presented in language associated with x86-compatible microprocessors and the x86 instruction set. And while the x86 architecture is ubiquitous and widely recognized within the art, the applicability of the present invention is by no means restricted to x86-compatible microprocessors. The present invention comprehends any microprocessor having operands-floating point, integer, or special types such as MMX@-which are stored and accessed by virtue of a stack. Corresponding exchange instructions for each data type can be absorbed into surrounding instructions through employment of the exchange extension feature. Moreover, different size stacks are accounted for by changing the exchange extension width.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor apparatus for performing a floating point exchange operation, the apparatus comprising:

translation logic, configured to receive an exchange macro instruction from a source therefrom, and to provide a micro instruction extension that directs the microprocessor to perform the floating point exchange operation, wherein said micro instruction extension is paired with a micro instruction for parallel execution within a floating point unit; and floating point register logic, coupled to said translation logic, configured to receive said micro instruction and said micro instruction extension, and to perform the floating point exchange operation in parallel with the operation directed by said micro instruction.

2. The microprocessor apparatus as recited in claim 1, wherein said exchange macro instruction comprises an x86 FXCH macro instruction.

3. The microprocessor apparatus as recited in claim 1, wherein said micro instruction corresponds to a macro instruction that is provided from said source therefrom.

4. The microprocessor apparatus as recited in claim 3, wherein said macro instruction comprises an x86 floating point macro instruction.

5. The microprocessor apparatus as recited in claim 3, wherein said macro instruction precedes said exchange macro instruction.

6. The microprocessor apparatus as recited in claim 3, wherein said macro instruction follows said exchange macro instruction.

7. The microprocessor apparatus as recited in claim 3, wherein said source therefrom comprises a translator queue.

8. The microprocessor apparatus as recited in claim 7, wherein said translator queue provides at least two macro instructions to said translation logic for decoding during the same clock cycle.

9. The microprocessor apparatus as recited in claim 8, wherein said exchange macro instruction prescribes an exchange stack register relative to a top-of-stack register, both of said registers residing in a floating point stack within said floating point unit, wherein the contents of said exchange stack register are to be swapped with the contents of said top-of-stack register.

10. The microprocessor apparatus as recited in claim 9, wherein said exchange micro extension prescribes said exchange stack register.

11. The microprocessor apparatus as recited in claim 10, wherein said floating point register logic comprises:

a renaming register, configured to store an absolute reference to a stack register, wherein said absolute reference is indexed by a relative reference to said top-of-stack register.

12. The microprocessor apparatus as recited in claim 11, wherein said floating point register logic further comprises:

exchange extension logic, coupled to said renaming register, configured to swap an exchange stack register absolute reference in said renaming register with a top-of-stack register absolute reference.

13. An apparatus in a pipeline microprocessor for executing a floating point exchange macro instruction, the floating point exchange macro instruction directing the microprocessor to exchange the contents of two floating point stack registers, the apparatus comprising:

an instruction decoder, for receiving the floating point exchange macro instruction and another macro instruction from a source therefrom, and for pairing execution of the floating point exchange macro instruction with execution of said another macro instruction;

an exchange micro instruction extension, provided by said instruction decoder, for directing the microprocessor to perform the operation prescribed by the floating point exchange macro instruction, wherein said exchange micro instruction extension is paired with a micro instruction corresponding to said another macro instruction; and floating point logic, coupled to said instruction decoder, for receiving said micro instruction and said micro instruction extension, and for executing the operation prescribed by the floating point exchange macro instruction in parallel with the operation prescribed by said another macro instruction.

14. The apparatus as recited in claim 13, wherein said another macro instruction comprises an x86 floating point macro instruction.

15. The apparatus as recited in claim 13, wherein said another macro instruction precedes the floating point exchange macro instruction.

16. The apparatus as recited in claim 13, wherein said another macro instruction follows the floating point exchange macro instruction.

17. The apparatus as recited in claim 13, wherein said source therefrom comprises a translator queue.

18. The apparatus as recited in claim 17, wherein said translator queue provides at least two macro instructions to said instruction decoder for translation during the same clock cycle.

19. The apparatus as recited in claim 18, wherein the floating point exchange macro instruction prescribes an exchange stack register relative to a top-of-stack register, both of said registers residing in a floating point stack within said floating point unit, wherein the contents of said exchange stack register are to be swapped with the contents of said top-of-stack register.

20. The apparatus as recited in claim 19, wherein said exchange micro extension prescribes said exchange stack register.

21. The apparatus as recited in claim 20, wherein said floating point logic comprises:

a renaming register, configured to store an absolute reference to a stack register, wherein said absolute reference is indexed by a relative reference to said top-of-stack register.

22. The apparatus as recited in claim 21, wherein said floating point register logic further comprises:

exchange extension logic, coupled to said renaming register, configured to swap an exchange stack register absolute reference in said renaming register with a top-of-stack register absolute reference.

23. A microprocessor for executing a floating point exchange operation in parallel with another operation within a single floating point execution unit, the microprocessor comprising:

a translate queue, for buffering a floating point exchange macro instruction and another macro instruction for decoding;

a translator, coupled to said translate queue, for decoding said floating point exchange macro instruction and said another macro instruction during a single clock cycle, for generating an exchange micro instruction extension corresponding to said floating point exchange macro instruction, for generating a micro instruction corresponding to said another macro instruction, and for coupling said exchange micro instruction extension to said micro instruction;

floating point register logic, coupled to said translator, for executing, in parallel, the floating point exchange operation and the other operation.

24. The microprocessor as recited in claim 23, wherein said another macro instruction comprises an x86 floating point macro instruction.

25. The microprocessor as recited in claim 23, wherein said another macro instruction precedes said floating point exchange macro instruction.

26. The microprocessor as recited in claim 23, wherein said another macro instruction follows said floating point exchange macro instruction.

27. The microprocessor as recited in claim 23, wherein said floating point exchange macro instruction prescribes an exchange stack register relative to a top-of-stack register, both of said registers residing in a floating point stack within the single floating point execution unit, wherein the contents of said exchange stack register are to be swapped with the contents of said top-of-stack register.

28. The microprocessor as recited in claim 27, wherein said exchange micro extension prescribes said exchange stack register.

29. The microprocessor as recited in claim 28, wherein said floating point register logic comprises:

a renaming register, configured to store an absolute reference to a stack register, wherein said absolute reference is indexed by a relative reference to said top-of-stack register.

30. The microprocessor as recited in claim 29, wherein said floating point register logic further comprises:

exchange extension logic, coupled to said renaming register, configured to swap an exchange stack register absolute reference in said renaming register with a top-of-stack register absolute reference.

31. A method for executing a floating point exchange operation in parallel with another operation, the operations being performed within a single floating point execution unit in a pipeline microprocessor, the method comprising:

a) decoding, in parallel, a floating point exchange macro instruction and another macro instruction, the floating point exchange macro instruction prescribing the floating point exchange operation and the other macro instruction prescribing the other operation;

b) adding an extension to a micro instruction that prescribes the other operation, the extension prescribing the floating point exchange operation; and c) providing the micro instruction with the extension to the single floating point execution unit during the same clock cycle.

32. The method as recited in claim 31, wherein said decoding comprises fetching the floating point exchange macro instruction and the other macro instruction from a queue during the same clock cycle.

33. The method as recited in claim 32, wherein the floating point exchange macro instruction precedes the other macro instruction in the queue.

34. The method as recited in claim 32, wherein the floating point exchange macro instruction follows the other macro instruction in the queue.

35. The method as recited in claim 32, wherein said adding comprises:

i) explicitly specifying an exchange register reference in the extension; and ii) implicitly specifying a top-of-stack register reference in the extension.

36. The method as recited in claim 35, further comprising:

d) swapping, within the single floating point execution unit, references to an exchange register and a top-of-stack register so that a subsequent top-of-stack reference in a following micro instruction points to the exchange register.

* * * * *